United States Patent [19]

Cox et al.

[11] 4,249,221

[45] Feb. 3, 1981

[54] METHOD AND APPARATUS FOR PREVENTING CONTAMINATION OF A ROTATING MAGNETIC DISC

[75] Inventors: Robert M. Cox, Northridge; Dan L. Kilmer, Sepulveda; Adam Kolkowski, Thousand Oaks, all of Calif.

[73] Assignee: SLI Industries, Inc., Woodland Hills, Calif.

[21] Appl. No.: 32,127

[22] Filed: Apr. 23, 1979

[51] Int. Cl.³ ............................................. G11B 17/02
[52] U.S. Cl. ...................................................... 360/97
[58] Field of Search ...................................... 360/97-99

[56] References Cited

U.S. PATENT DOCUMENTS 4,054,931  10/1977   Bolton et al. ........................... 360/97
4,130,845  12/1978   Kulma ..................................... 360/97

Primary Examiner—Robert S. Tupper
Attorney, Agent, or Firm—Fulwider, Patton, Rieber, Lee & Utecht

[57] ABSTRACT

A method and apparatus are provided for preventing contamination of a rotating magnetic disc by particles outgassed from or through the bearings upon which the disc is mounted for rotation. This is accomplished by maintaining a differential pressure across the bearing nearest the magnetic disc compartment with the higher pressure inside the compartment so that any particles outgassed from the bearing or bearing chamber are constrained to migrate toward a region of lower pressure within the bearing chamber and therefore away from the magnetic disc compartment.

7 Claims, 2 Drawing Figures

METHOD AND APPARATUS FOR PREVENTING CONTAMINATION OF A ROTATING MAGNETIC DISC

BACKGROUND OF THE INVENTION

This invention relates generally to magnetic disc drives, and more particularly, to a method and apparatus for preventing contamination of a magnetic disc by particles outgassed from a central bearing assembly upon which the disc is mounted for rotation.

As is well known in the art of magnetic disc information storage and retrieval systems, it is essential that the disc or discs upon which information is to be stored are kept as clean as possible to avoid interference with the read/write heads which must operate in very close proximity to the surface of the disc. Toward this end, air is ordinarily circulated inside the compartment containing the rotating magnetic disc and caused to pass through a filter to constantly remove small particles from the air within the compartment. Although filtration of the air surrounding the disc helps to maintain the clean atmosphere required for reliable operation of a magnetic disc, minute particles, generally of lubricants, will occasionally outgas from the central bearing or bearings upon which the disc is mounted for rotation. If these particles, or any other particles within the bearing chamber, are permitted to migrate onto a surface of the magnetic disc, interference with the reliable operation of the information storage and retrieval system is likely to result.

In order to inhibit the outgassing of particles from the central rotary bearings, hermetically sealed bearings are ordinarily employed, but even these bearings are capable of outgassing a sufficient quantity of contaminants to interfere with operation of the information storage and retrieval system. Accordingly, attempts have been made to overcome this problem by interposing a labyrinthine passage between the bearing nearest the magnetic disc compartment and the compartment itself. While this arrangement serves to slow the migration of outgassed particles from the bearing to the disc compartment, some contamination of the disc may still occur after the system has operated for a sufficient period of time.

This problem is particularly troublesome in an information storage and retrieval system in which the magnetic disc compartment is sealed and the disc, or group of discs, is intended to be non-removable. In such a system, it is very important that no contaminating particles are permitted to enter the disc compartment for the entire useful life of the disc drive mechanism.

Accordingly, there exists a need for a convenient and effective method and apparatus for preventing the contamination of a rotating magnetic disc by particles outgassed from the central bearing upon which the disc is mounted for rotation. As will become apparent from the following, the present invention satisfies that need.

SUMMARY OF THE INVENTION

The present invention resides in a new and improved magnetic disc drive apparatus and method by which particles outgassed from a central bearing on which the disc is mounted are prevented from migrating into the magnetic disc compartment and contaminating the disc or discs located therein. This is accomplished generally by creating a positive air pressure within the disc compartment, placing this positive pressure in communication with one side of the central bearing nearest the disc compartment, and placing the other side of the same bearing in communication with atmospheric pressure. In this way, any particles which may be outgassed from the bearing must migrate, if at all, from the region of elevated pressure in the disc compartment toward the region of lower, atmospheric pressure outside of the disc compartment.

More specifically, a centrifugal fan is provided on the rotary hub on which the magnetic disc is mounted, and the fan is arranged to force air radially outwardly below the disc thereby providing the desired air flow for circulating air through a filter as well as providing the desired elevated air pressure above the rotating disc or group of discs. A clamp overlies the hub and secures the magnetic disc to the hub, and the elevated air pressure above the disc is permitted to communicate with the rotary bearing nearest the disc compartment through a series of apertures in the clamp and hub. The other side of the bearing is placed in communication with atmospheric pressure through an aperture which connects a central bearing chamber with atmospheric pressure below and outside of the magnetic disc compartment.

In accordance with another feature of the present invention, turbulent air flow is generated above the disc in order to ensure that a positive pressure is applied to the side of the aforementioned bearing adjacent the disc compartment. This can be accomplished by providing a rib or arm extending above the disc to interrupt any laminar flow and generate the desired turbulent flow above the disc.

Other features and advantages of the present invention will become apparent from the following detailed description, taken in conjunction with the accompanying drawings which illustrate, by way of example, the principles of the invention.

DETAILED DESCRIPTION

Figure 1:
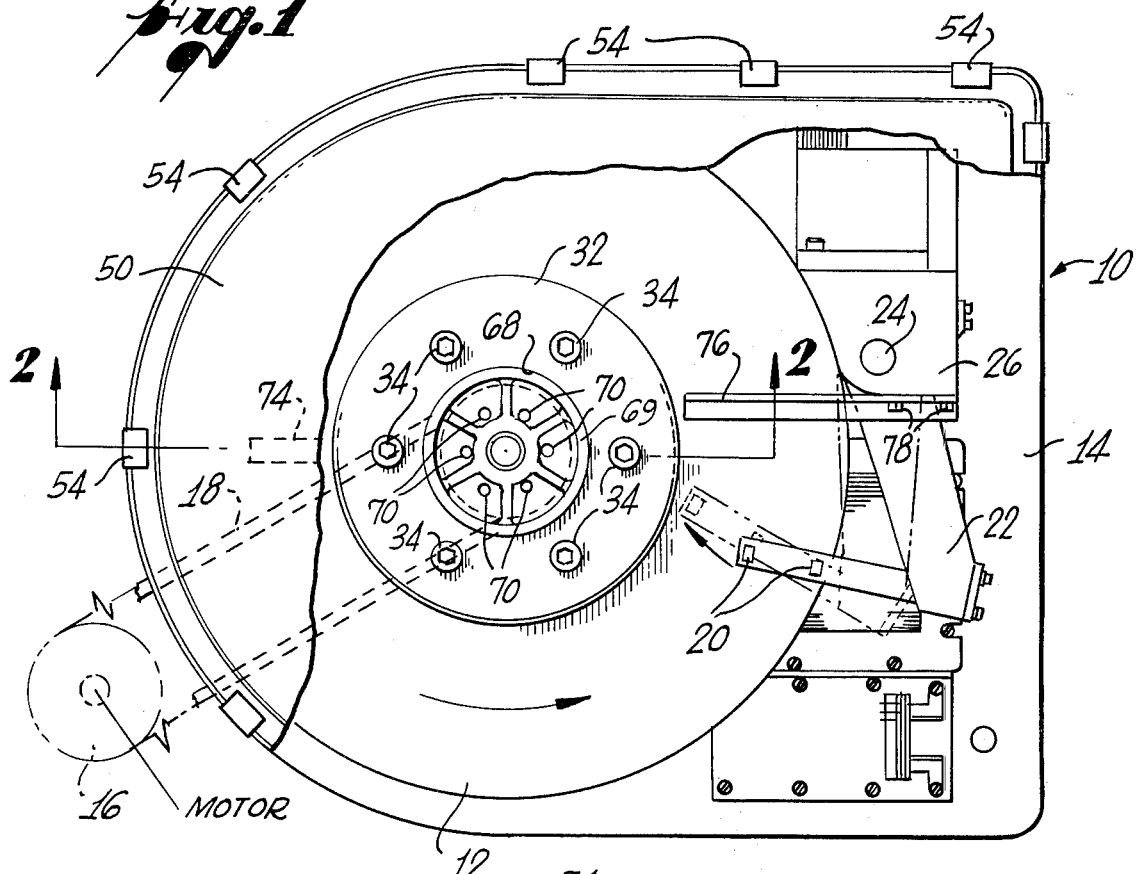
FIG. 1 is a plan view of a magnetic disc drive mechanism embodying the present invention and illustrated with a portion of its cover broken away.

As shown in the exemplary drawings, the present invention is embodied in a magnetic disc drive mechanism, indicated generally by reference numeral 10 in FIG. 1, for use with an information storage and retrieval system (not shown). In this instance, the disc drive mechanism is adapted to accommodate four separate magnetic discs 12 (FIG. 2), but it will be appreciated that the present invention is suited for use on a drive mechanism which drives any number of discs 12.

The drive mechanism 10 is mounted on a base plate 14 and arranged to drive the discs 12 rotationally, as indicated by the arrow in FIG. 1, in a generally horizontal plane. For this purpose, a motor 16 is provided which drives the discs by means of a drive belt 18 (shown in phantom line in FIG. 1). In order to store information on the discs 12, and retrieve information therefrom, a number of read/write heads 20 are mounted on a movable arm 22 which pivots about a pin 24 between the positions shown in full line and phantom line in FIG. 1. The position of the arm 22, which determines the position of the read/write heads 20, is accurately controlled by a linear motor 26 mounted on the base plate 14.

Figure 2:
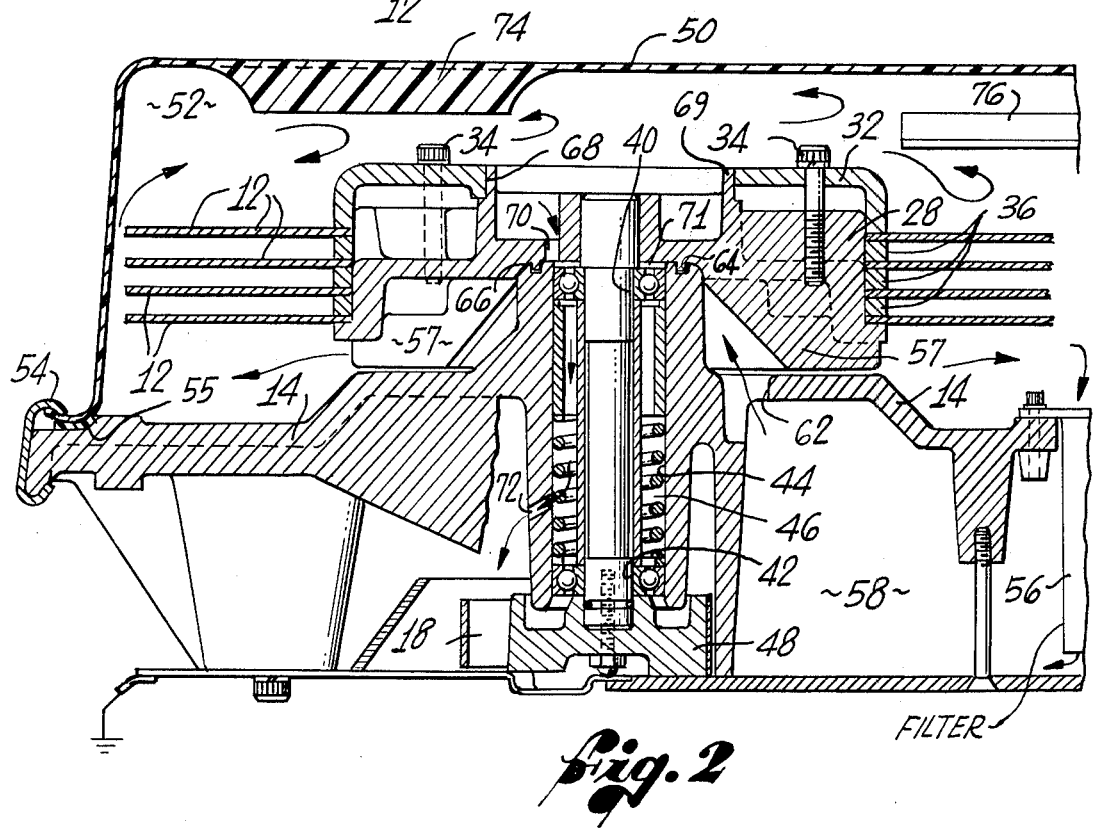
FIG. 2 is an enlarged, fragmentary, elevational view of the disc drive mechanism of FIG. 1, taken in cross-section generally along line 2—2 of FIG. 1.

As can best be seen in FIG. 2, the discs 12 are mounted on a rotary hub 28 and are supported on a flange 30 extending radially from the hub. The discs are secured to the hub by a clamp 32 which overlies the hub, bears against a portion of the uppermost disc 12, and is secured to the hub 28 in any suitable manner, such as by a plurality of bolts 34. When more than one disc is mounted on the hub (as illustrated, for example, in FIG. 2), appropriate spacers 36 can be provided between the discs so that read/write heads can then be inserted between the discs to store and retrieve information from both the upper and lower sides of the discs. The spacers 36 also ensure that all of the discs 12 are held securely between the flange 30 and the clamp 32.

In order to provide for rotation of the hub 28 with respect to the base plate 14, the hub is supported on a spindle 38 which is mounted for rotation in an upper rotary bearing 40 and a lower rotary bearing 42. The outer races of the bearings 40 and 42 are secured near opposite ends of a central bore 44 in the base plate 14, forming a bearing chamber 46 between the bearings 40 and 42. A drive pulley 48 is affixed to the lower end of the spindle 38, and the drive belt 18 engages the drive pulley 48 for imparting rotary motion to the spindle 38, and therefore to the hub 28 and magnetic discs 12.

As mentioned above, the environment within which the magnetic discs operate must be kept as clean as possible in order to provide accurate and reliable operation of the magnetic disc information storage and retrieval system. Toward this end, a cover 50, preferably formed of a moldable plastic material, is disposed over the entire disc drive mechanism 10 and cooperates with the base plate 14 to form an air-tight magnetic disc compartment 52. The cover 50 can be secured to the plate 14 by a plurality of resilient cover clips 54 and sealed to plate 14 by a soft seal 55. By carefully controlling the environment within the magnetic disc compartment 52, the discs 12 can be kept free of contaminants, and the desired high degree of reliable operation can be achieved.

For the purpose of constantly cleaning the air within the compartment 52, a series of radially extending fins 57 is formed on the lower portion of the hub 28, and when the hub is rotated in normal use, the fins 57 act as a centrifugal fan to force air radially outwardly below the discs 12. As can best be seen in FIG. 2, the air forced outwardly by the fins 57 flows through a closed circuit in the drive mechanism 10, which circuit includes a filter 56 disposed through the base plate 14, an air plenum 58 below the base plate formed by cooperation of the base plate and an air plenum cover 60 secured to the base plate, and an opening 62 through the base plate adjacent the central bore 44 which acts as an air inlet to the centrifugal fan formed by the rotating fins 57.

In operation of disc drive mechanisms similar to the device illustrated in FIGS. 1 and 2, it has been found that even when the bearings 40 and 42 are hermetically sealed, the bearings eventually outgas some minute particles, usually of lubricant, and those particles, if allowed to migrate to the surface of one of the discs 12, can interfere with the reliable operation of the information storage and retrieval system with which the disc drive mechanism 10 is used. In addition, it is possible that some amount of air from within the bearing chamber 46 might flow through the upper bearing 40 and contaminate the disc compartment 52. In order to inhibit the migration of any particles outgassed from the bearing 40 or bearing chamber 46 into the disc compartment 52, a labyrinthine passage can be interposed between the bearing 40 and the disc compartment.

One way in which this can be accomplished is by forming an annular groove 64 in the base plate 14 surrounding the upper end of the bore 44 and forming a cooperating annular lip 66 extending downwardly from the hub 28 into the groove 64. By this arrangement, the migration into the compartment 52 of any particles outgassed from the bearing 40 or bearing chamber 46 can be slowed significantly. However, in an application where the same magnetic discs are to be used in a drive mechanism for an extended period of time, some particles outgassed from the central bearing chamber or bearing may eventually be deposited on a surface of one of the discs and have an adverse effect on the operation of the information storage and retrieval system. It follows, then, that in a drive mechanism in which the disc compartment 52 is sealed and the discs are intended to be non-removable, it is desirable to prevent any outgassing of particles from the central bearing chamber or bearings into the disc compartment.

In accordance with the present invention, a method and apparatus is provided for ensuring that no contaminating particles are able to migrate from the central bearing chamber 46 or the bearings 40 or 42 into the magnetic disc compartment 52. This is accomplished by creating a positive pressure within the disc compartment, placing this positive pressure in communication with the end of the bearing chamber 46 adjacent the disc compartment, and placing the bearing chamber in communication with atmospheric pressure.

The positive pressure is created in the magnetic disc compartment 52 by operation of the radial fins 57 on the hub 28. As described above, when the hub 28 is rotated in normal use of the disc drive mechanism 10, air is forced radially outwardly below the discs 12. This air circulates around the outer edges of the discs 12, over the top of the discs, through the filter 56 and air plenum 58 and back to the central portion of the hub 28 through the opening 62. It will be appreciated, then, that the centrifugal fan on the hub 28 operates to maintain a positive pressure in the disc compartment above the discs 12.

In order to impose this positive pressure on the end of the bearing chamber 46 adjacent the disc compartment 52, a central opening 68 in the clamp 32 cooperates with an upstanding annular collar 69 on the hub 28 to expose the top of the hub to air pressure in the disc compartment 52 above the discs 12. Further, a group of apertures 70, in communication with the opening 68, is provided through the hub 28, radially inwardly of the annular rib 66, and opening into an annular chamber 71 at the interface between the disc compartment 52 and the bearing chamber 46. With this arrangement, the positive pressure created above the discs 12 can communicate through the apertures 70, and a positive pressure will be maintained above the bearing 40 at the annular chamber 71. Some air leakage may occur through the labyrinthine passage between the groove 64 and annular lip 66. However, the area of the apertures 70 is greater than the area of the labyrinthine passage so that a positive pressure is maintained in the annular chamber 71.

Migration into the disc compartment 52 of any particles outgassed from or passing through the bearing 40 can be prevented by ensuring that the air pressure in the annular chamber 71 above the bearing 40 during operation of the drive mechanism 10 is always greater than the air pressure in the bearing chamber 46 below the bearing 40. Toward this end, an aperture 72 is formed through the wall of the bearing chamber 46 below the bearing 40 and below the base plate 14, thereby venting the bearing chamber 46 to atmospheric pressure outside of the disc compartment 52. In this way, the positive pressure maintained within the annular chamber 71 will always be greater than the atmospheric pressure in the bearing chamber 46, and any particles which may be outgassed from the bearing 40 must migrate, if at all, from the region of elevated pressure in the annular chamber 71 toward the region of lower, atmospheric pressure in the bearing chamber 46.

In operation of the drive mechanism 10 of the present invention, it has been found that the flow pattern of air circulating above the discs 12 occasionally will become laminar and temporarily cause the elevated air pressure adjacent the apertures 70 to decrease significantly. The laminar flow is believed to be caused by a vortex formed above the discs due to the rotation of the discs, and if the resultant decrease in pressure is significant enough, it is possible that the pressure communicated to the annular chamber 71 could fall below the atmospheric pressure maintained in the bearing chamber 46. This would have the undesirable effect of permitting particles outgassed from the bearing 40 to enter the annular chamber 71 and migrate into the disc compartment 52.

Therefore, in accordance with a further feature of the present invention, turbulent air flow is generated in the disc compartment 52 above the magnetic discs 12 to ensure that a positive pressure is applied to the annular chamber 71 above the bearing 40. This can be accomplished by providing a means in the disc compartment 52 for interrupting laminar flow above the discs 12.

As can best be seen in FIG. 2, laminar flow above the discs 12 can be interrupted by providing an elongated rib 74, or a series of ribs, formed integrally with the cover 50, projecting downwardly therefrom and extending radially of the discs 12. Another means for interrupting laminar air flow above the discs 12 is a rigid arm 76 extending generally radially and above the discs and secured in a fixed position to the housing of the linear motor 26 in any suitable manner, such as by a pair of bolts 78 (FIG. 1). Either of these means is sufficient to generate the desired turbulent air flow above the discs, as indicated by the arrows in FIG. 2, and the turbulent flow ensures that a positive pressure will be maintained adjacent the apertures 70 and therefore within the annular chamber 71, above bearing 40. It will be appreciated that any other suitable means can be employed to interrupt laminar flow above the discs and generate the desired turbulent flow, such as bumps or other irregularities on the inside surface of the cover 50, but the integrally formed rib 74 and the arm 76 are the presently preferred means.

From the foregoing, it will be appreciated that the present invention provides a method and apparatus for ensuring that no contaminating particles are able to migrate from the central bearing chamber 46 or the bearings 40 or 42 into the magnetic disc compartment 52. Further, the present invention greatly enhances the reliable operation and useful life of a magnetic disc drive mechanism, and the apparatus of the present invention can be fabricated conveniently and economically and can be adapted for use with existing disc drive mechanisms employing either single or multiple disc arrangements.

While a particular form of the invention has been illustrated and described, it will be apparent that various modifications can be made without departing from the spirit and scope of the invention.

We claim:

1. In a mechanism for rotary driving of a magnetic disc, said mechanism including a base plate, a central bearing chamber in said base plate having at least one bearing mounting a hub for rotation about an axis, a magnetic disc supported on said hub and secured thereto by a clamp, and a cover which overlies said disc and cooperates with said base plate to form an enclosed compartment within which said disc rotates, one end of said bearing chamber forming an interface between said bearing chamber and said enclosed compartment;

an apparatus for preventing contamination of said disc by particles outgassed from said bearing chamber, said apparatus comprising:

means for maintaining an elevated pressure in said compartment;

an aperture through a portion of said hub overlying said interface for placing said elevated pressure in communication with said interface; and means for placing said bearing chamber in communication with atmospheric pressure outside of said enclosed compartment.

2. An apparatus as set forth in claim 1 wherein said means for maintaining an elevated pressure in said enclosed compartment is a centrifugal fan mounted for rotation with said hub and arranged to circulate air within said compartment and maintain said elevated pressure above said disc.

3. An apparatus as set forth in claim 1 further including a means for interrupting laminar flow of air above said disc.

4. An apparatus as set forth in claim 3 wherein said means for interrupting laminar flow is an integrally formed rib projecting downwardly from the top of said cover.

5. An apparatus as set forth in claim 3 wherein said means for interrupting laminar flow is an arm disposed above said disc and secured in a stationary position with respect to said base plate.

6. An apparatus for preventing contamination of a rotating magnetic disc by particles outgassed from a central bearing upon which said disc is mounted for rotation, said apparatus comprising:

a base plate including a generally vertical central bore having a spindle mounted therein for rotation about a vertical axis and supported in an upper rotary bearing secured in said bore adjacent the upper end thereof and a lower rotary bearing secured in said bore adjacent the lower end thereof, said upper and lower bearings cooperating with said bore to form a bearing chamber in said bore between said bearings;

a hub mounted for rotation with said spindle on an extension of said spindle above said upper bearing and above said base plate, said hub including a plurality of radially extending fins on the lower side thereof;

a magnetic disc mounted on said hub for rotation with said hub and secured thereto by a clamp overlying said hub and a portion of said disc;

a cover secured to said base plate and overlying said disc, said cover cooperating with said base plate to form an enclosed compartment within which said disc rotates;

a circuit for air circulating under the influence of said fins on said hub, said circuit including said enclosed compartment, a filter disposed in said base plate, and air plenum below said base plate, and a return opening in said base plate adjacent said central bore, whereby rotation of said hub causes said fins to maintain an elevated pressure in said enclosed compartment;

a first aperture in a central portion of said clamp, a second aperture in a central portion of said hub, communicating with said first aperture, and with said upper bearing, whereby said elevated pressure is imposed upon the upper side of said upper bearing;

a third aperture in said bearing chamber below said base plate, placing said bearing chamber in communication with atmospheric pressure below said base plate and outside of said enclosed compartment; and a stationary means in said compartment above said disc for generating turbulent air flow above said disc and maintaining said elevated pressure adjacent said first aperture.

7. In a mechanism for rotary driving of a magnetic disc, said mechanism including a base plate, a central bearing chamber in said base plate having at least one bearing mounting a hub for rotation about an axis, a magnetic disc supported on said hub and secured thereto by a clamp, and a cover which overlies said disc and cooperates with said base plate to form an enclosed compartment within which said disc rotates, one end of said bearing chamber forming an interface between said bearing chamber and said enclosed compartment;

an apparatus for preventing contamination of said disc by particles outgassed from said bearing chamber, said apparatus comprising:

means for maintaining an elevated pressure in said compartment;

means for placing said elevated pressure in communication with the interface between said bearing chamber and said enclosed compartment; and an aperture in said bearing chamber below said base plate for placing said bearing chamber in communication with atmospheric pressure outside of said enclosed compartment.

* * * * *